June 25, 1957 C. U. STOLTZFUS 2,797,028
MATERIAL SPREADER

Filed Oct. 12, 1953 3 Sheets-Sheet 1

INVENTOR.
CHRISTIAN U. STOLTZFUS
BY William H Bender
ATTORNEY

June 25, 1957   C. U. STOLTZFUS   2,797,028
MATERIAL SPREADER
Filed Oct. 12, 1953   3 Sheets-Sheet 2
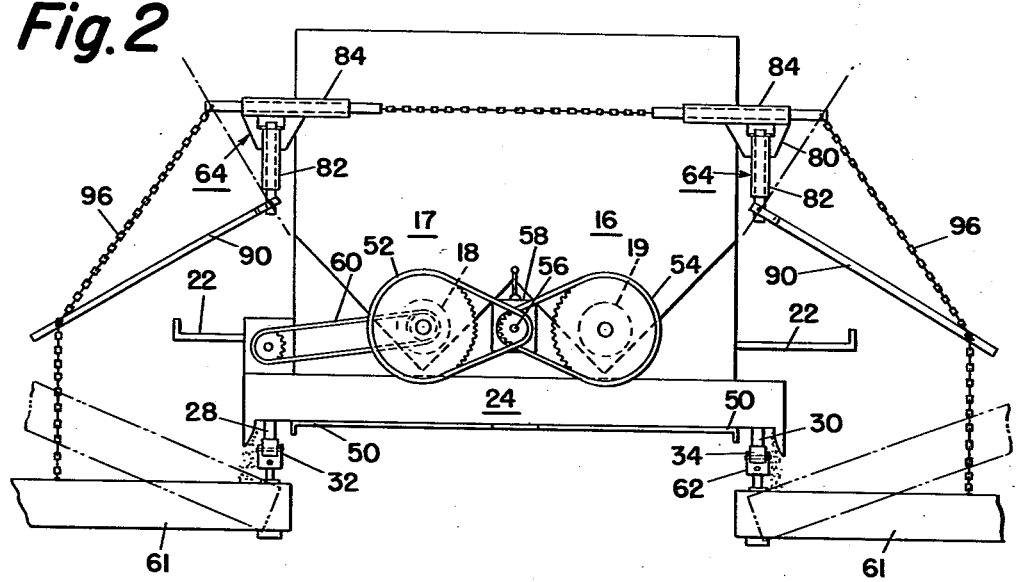
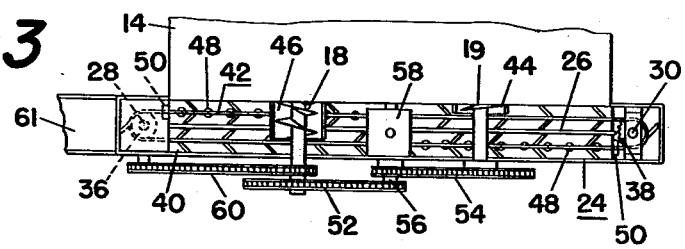
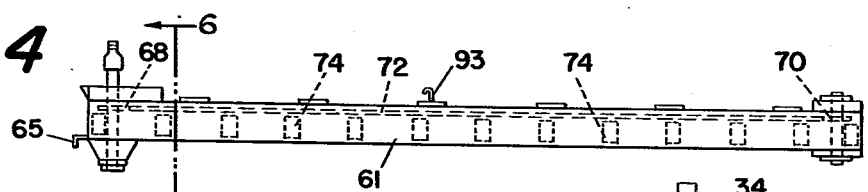
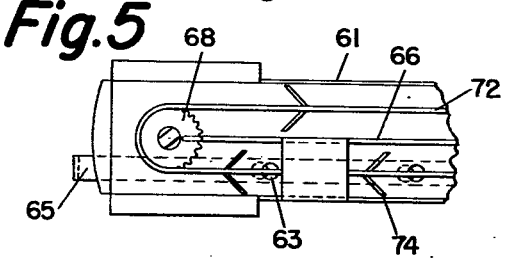
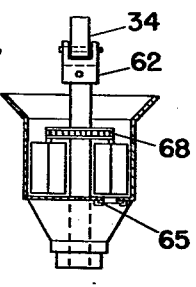
INVENTOR.
CHRISTIAN U. STOLTZFUS
BY William H Bender
ATTORNEY June 25, 1957     C. U. STOLTZFUS     2,797,028
MATERIAL SPREADER
Filed Oct. 12, 1953     3 Sheets-Sheet 3
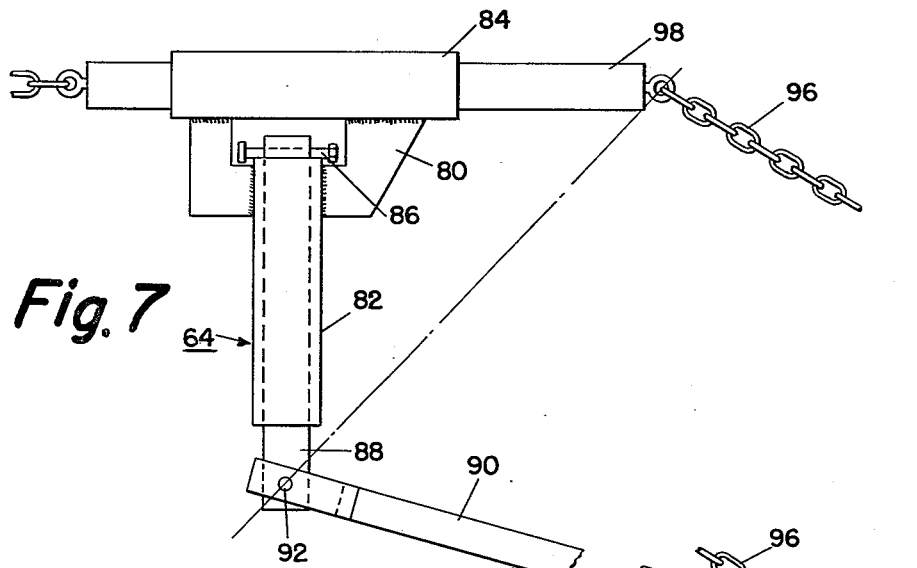
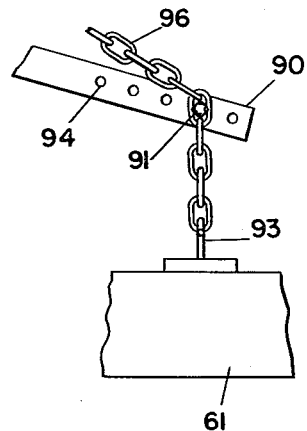
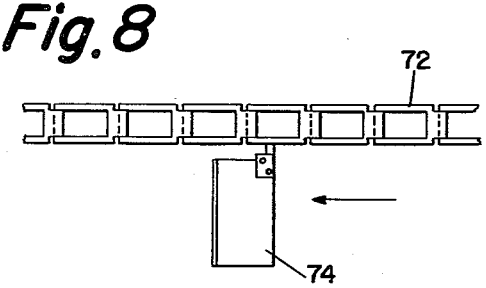
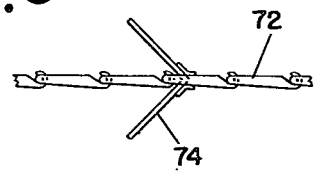
*INVENTOR.*
CHRISTIAN U. STOLTZFUS
BY
ATTORNEY

United States Patent Office 2,797,028
Patented June 25, 1957

2,797,028

MATERIAL SPREADER

Christian U. Stoltzfus, Joanna, Pa.

Application October 12, 1953, Serial No. 385,555

7 Claims. (Cl. 222—252)

This invention relates in general to agricultural machinery and specifically to motor vehicle mounted machinery used in spreading pulverant material on the ground.

An object of this invention is to provide a device of this character which will distribute fertilizer materials, such as limestone, completely over an area extending beyond the limits of the supporting motor vehicle in even, controlled quantities.

Another object is to provide flexibility in the spreading means by which continuous operation is made possible.

Still another object is to provide an extended spreading means which will return to the initially established position notwithstanding deflection by obstacles.

And yet another object is to provide a mechanism for spreading pulverant material which can be adjusted in configuration with the ground to insure proper application of the material.

In general, the invention comprises a vehicle mounted assembly arranged to transmit lime or other pulverant material from the body thereof to a laterally positioned spreading assembly on the rear. The lateral spreading assembly is divided into a middle section attached to the body or hopper and flexibly attached extensions connected to the middle section to carry the operation of spreading transverse the direction of vehicle travel beyond the limits of the transport body.

Especially constructed and positioned sub-elements maintain the extensions close to the ground and permit them to encounter and pass obstacles without damage or permanent dislocation from the pre-established spreading position. A more specific object of the invention is therefore, to provide a spreader easily and quickly assembled into an adjusted and permanently established position for the spreading operation.

These and other objects will be evident in the combination and details of construction disclosed in the specification which follows, read in conjunction with the drawings in which:

Figure 2 is a rear elevation showing the position of the operating elements.

Figure 3 is a plan view of the middle compartment of the distributing section.

Figure 4 is an elevation of the lateral spreader extension.

Figure 5 is a plan view of the section shown in Figure 4.

Figure 6 is a sectional view of Figure 4 taken on line 6—6.

Figure 7 is a reduced detail of the pivotal suspension element which supports the spreader extensions.

Figures 8 and 9 are details of the chain distributor.

Figure 1:
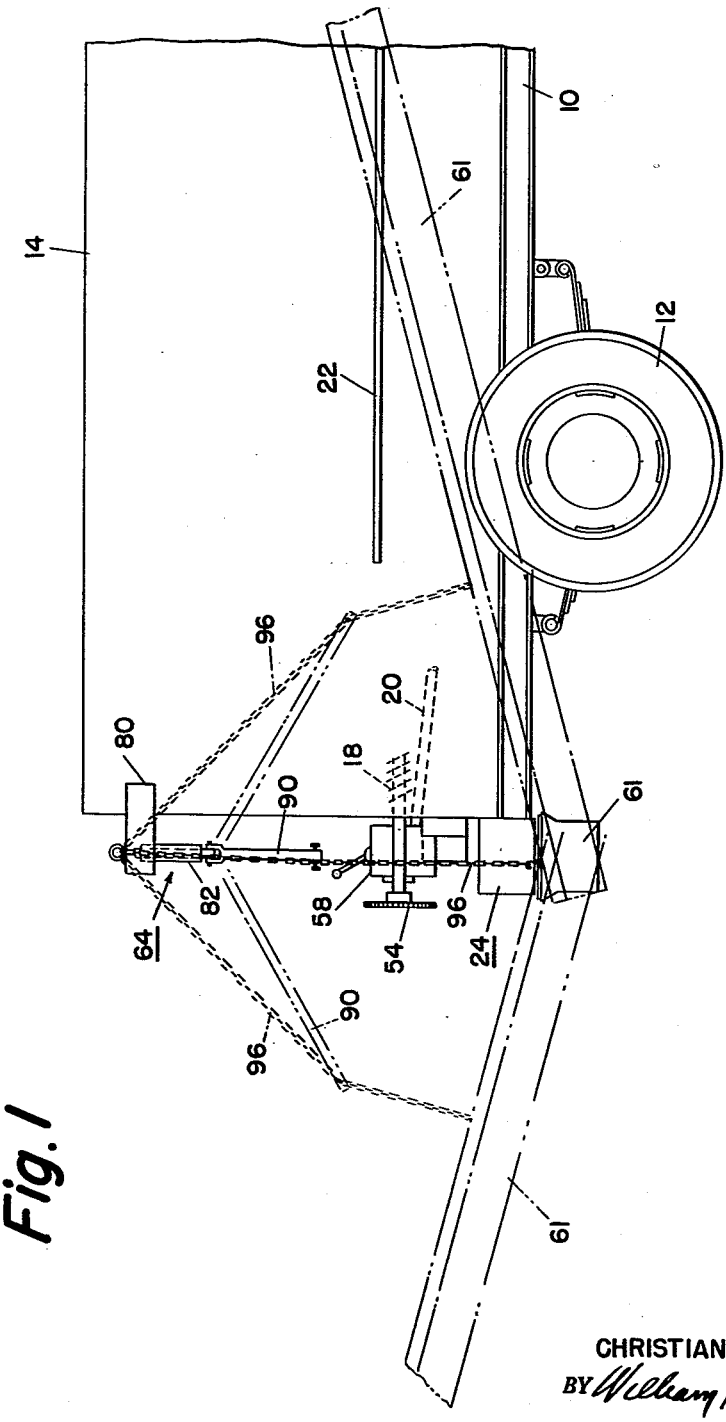
Figure 1 is a side elevation of the device, partly in section.

Since adopting the practice of spreading pulverant materials in farming, uniform distribution and continuous, controlled application have been the goal of all such operations. Uneven ground, obstacles, slopes and wind disturbances have been some of the problems which must be overcome. It will be evident that one or several of these problems can be solved by a variety of means. However, to overcome them all by one piece of equipment requires a spreading device which is adjustable relative to the ground, controls the feed of the pulverant material across the full width of the spreading mechanism, is flexible in meeting and overcoming obstacles, and yet remains constantly in the proper spreading position. Ease of operation and speed in application of the material further demand that all these requirements be accomplished without detaching or periodically adjusting the spreader extensions, or otherwise interrupting the spreader operation.

Referring to the drawings, Figure 1 shows in elevation the rear portion of a motor vehicle on which the spreading mechanism of this invention is conveniently mounted. The chassis 10, supported by wheels 12, comprises the frame on which a body or hopper 14 is secured. To facilitate the constant feed of pulverant material to the spreader elements, later to be described, the hopper is shaped to deliver this material to two troughs 16—17 better shown in Figure 2. Augers 18 and 19 positioned to cooperate with the hopper 14, are shown in the troughs 16—17. The raised portion of the bottom of the hopper between the troughs covers the power take-off shaft 20 extending rearwardly from the vehicle power plant, not shown. Shelf supports 22 are mounted on each side of the body to carry the spreader extensions when not in use.

On the rear of the chassis 10, and extending across the width of the hopper 14 in position to cooperate with the feed augers 18 and 19, the middle section of the transverse spreading assembly is fixed. This section, designated inclusively by the numeral 24, is divided lengthwise by a partition 26 as shown in Figure 3. Partition 26 extends substantially the full length of the middle section stopping short of each end to allow room for the vertical drive shafts 28 and 30. Each of these shafts 28 and 30 are extended above and through the bottom of the middle section for support and to engage universal joints 32 and 34 respectively. Gears 36 and 38 are connected to these shafts 28 and 30, respectively, within the trough body 40 of the section and mount a chain distributor 42 therein.

Beneath the augers 18 and 19 extending from the hopper 14 and above the middle spreading section, two trough extensions 44 and 46 are placed. These extensions are constructed to deliver the pulverant material from the separate auger feeds to separate sides of the dividing partition 26 in the middle spreader section. The bottom of the trough body 40 of this middle section is apertured in the section which receives the material for spreading, depending on the direction of the chain distributor 42 movement. These apertures 48 are shown in the proper halves of the middle section trough in Figure 3, and in proper relation to the indicated direction of chain distributor travel. Adjusting slides 50 slotted to fully uncover the apertures 48 if desired, present a means of reducing the size of these apertures as a control of the quantity of material to be spread.

The shafts mounting the augers 18 and 19 are extended beyond the width of the middle spreading section trough body and terminate in sprocket chain mechanisms 52 and 54. These sprocket chain mechanisms connect the transmission drive shaft 56 extending from the transmission 58 through which the power of the shaft 20 is transmitted. By inserting a transmission at this point, further flexibility in the speed of operation of the spreader mechanism is attained. Driving power is transmitted to the chain distributor 42 in the middle section of the spreader by an additional chain sprocket mechanism 60 connecting the extended shaft of auger 18 to a transverse drive shaft cooperating with the vertical drive shaft 28. By tracing this power distribution system, it is readily seen that all moving elements are driven from one transmission and thus are coordinated in their functions.

Although an auger construction is described as the mechanism for moving the pulverant material to the rear of the body or hopper 14, it will be apparent to those versed in the art that other well known means will work equally as well. Endless belts, bucket chains and the like, a movable bottom for the hopper or simple agitating means in a properly shaped hopper would satisfy the requirement. It is only necessary to feed the pulverant material to the transversely arranged trough in quantity adjusted to meet the spreading requirements of the separately operating halves as described.

An understanding of the construction of the spreader extensions adapted to cooperate with the middle spreader section detailed above, will require reference to Figures 4, 5 and 6, in addition to those already mentioned. In Figures 1 and 2, the trough like member noted as extension 61 is shown connected in the sleeve 62 and the universal joint 34 on the end adjacent the middle section 24 and suspended from the pivotal suspension element 64. The connection through the universal joint suspends the inner end of trough member 61 and transmits operating power to the pulverant material moving means yet to be described, while the pivotal suspension swingably supports it above the ground in proper position.

Reference to Figures 4 to 6 inclusive shows the extension 61 in detail. As both of these sub-elements, extending to the right and left of the supporting vehicle, are alike in construction and operation only one will be described. The body of extension 61, shaped as a hollow trough, is divided lengthwise by a partition 66 as was the middle section 24 described above. This partition 66 extends substantially the full length of the member being terminated near each end to allow for sprocket gears 68 and 70.

An endless chain 72 connects the gears 68 and 70 and supports scrapers 74, V-shaped in cross section to gather and push the material along the trough body. Peripherally these scrapers 74 are shaped to engage the inner surfaces of the trough member to move all the pulverant material and avoid clogging. Although a rectangular trough section is illustrated, any cross-sectional shape which affords close cooperation between the trough section and the scrapers will produce the desired result. These scrapers are moved in the partition divided halves of the body member 60, carrying the pulverant material to the apertures 63. Adjustable slides 65 apertured to regulate the sizes of the apertures 63 are also affixed to the body member 61 to control the rate of spreading of the powdered material.

The remaining figures in the drawing are included to make clearer the elements and sub-elements singly and in combination which make the operation of the disclosed device in the desired way possible. These items are shown in a form preferred for their operation, ease of construction and resistance to wear, but as noted, are not intended to be exclusive. Substitutes will be apparent to those versed in the art and others will be suggested by the form of those disclosed.

Reference to Figures 7 shows the pivotal suspension means 64 by which the spreader extension 61 is, in part, connected to the supply hopper 14. By including adjustable features together with relatively fixed pivotal points, the flexibility of the device described above is achieved. A bracket 80, attached to the hopper 14 as shown in Figures 1 and 2, is positioned to substantially align the vertical tube or sleeve 82 with the universal joint 34 and drive shaft, 28 and 30 respectively, positioned therebelow. A transverse sleeve 84 is positioned above the top of sleeve 82 with sufficient room between them to permit the pin 86 to hold the end of the tubular member 88. In the lower part of the member 88, below the sleeve 82, a bifurcated member 90 is connected by the pin 92 to member 88 as a pivotal point. This member 90 forms the relatively fixed pivot and extends outwardly and downwardly as a spacer into cooperation with the point of suspension of the spreader extension 61. Holes 94 in the free end of this member permit flexibility of adjustment as will be fully understood after reading a description of the operation of this device hereafter.

In cooperation with the fixed pivot 92 detailed above, an adjustable pivot controlling the operating position and overcoming the rigidity common to mechanisms of this type, is supplied by means of the chain 96 or other flexible means as a cable, and the adjustable tube or bar 98 if the flexible member be permanently attached thereto, which pass through the fixed sleeve 84. As this sleeve 84 is transverse the pivotal suspension of the member 90 and above the pivot point 92, adjustment inwardly or outwardly changes the second point of pivotal suspension which is by the chain or cable about the end of the transverse tube or bar 98. The chain passes downwardly to connect with the holes 94 in the member 90 by means of a bolt 91 and then to engage the supporting hook 93 fastened to the top of the spreader member 61. This supporting hook 93 attached to extension 61 is arranged inwardly toward the motor wheels from the point of balance. In this way the outer end is always heavier, permitting easy adjustment groundwardly and forces the inwardly extending universal joint engaging end into firmer contact with the driver connection. By changing the length of chain, position of the adjustable tube 98, position of the bolt 91 in the holes 94 or linkage engagement of the hook 93, a large combination of adjustments is possible.

With the exception of the two auger members 18 and 19 which are described as feeding the powdered material from the hopper to the lateral or transverse spreader members, and which may take other forms as noted, the feeder means in each section of the spreading assembly has been described as a chain operating in conjunction with a sprocket member up and down the length of the spreader body on each side of a middle partition. As will be understood in reading the description of operation, this arrangement has particular advantages and forms a new approach to the spreading problem. In Figures 8 and 9, a typical chain 72 used with agricultural machinery as those versed in this art will recognize, is the support for a plurality of V-shaped scrapers 74 adapted to cooperate with the trough shape in moving the pulverant material. The sprockets, for example 68 and 70 in Figures 4 and 5 which mount the chain in operating position, are above the bottom of the trough member 60 a distance to utilize the scrapers 74 to their maximum possibility.

The above described spreader mechanism, mounted on a motor vehicle chassis, is readily transported over roads by placing the extensions 61 on the shelf supports 22 mounted on each side of the hopper body 14. On arrival at destination, the chain 96 is engaged in the hook 93 and the end of the spreader member 61 supporting the universal joint engaging sprocket drive 68 is lowered into engagement and fastened in the joint sleeve 62. The forward end, still on the support 22 is then swung outwardly, free of the vehicle body and is supported above the ground by the pivotal suspension means 64. Adjustment of the chain 96 in length raises or lowers the extension about the universal joint connection. Where slopes are to be spread, it may be necessary to shorten one chain and lengthen the other to adjust the separate extensions for the best operation on the respective sides of the vehicle.

By adjusting the tube or bar 98 inwardly or outwardly the pivotal point of the chain 96 is moved into or away from the line above the fixed pivot 92. This requires the extension to swing forward and backward on the universal joint in a longer or shorter arc, at the same time lifting above the original adjustment proximate the ground as shown by phantom line in Figures 1 and 2 of the drawing. If the chain pivot is placed immediately in line with the fixed pivot the amount of lift is so limited as to make the extension swing almost horizontally forward or backward. On the other hand, a wide change of the pivotal relationship will cause an abrupt and rapid lift of the extension when it is moved forward or backward. In this way a proper adjustment for rapid or slow recovery of the spreader member to the original adjustment after encountering an obstacle is possible. This is of great importance in country where stumps of trees and boulders are present. Further, by swinging the spreader extensions backward they lift and may be tied together to make short runs of the equipment or to pass through a gate or other narrow passage. As the universal joints are readily flexible, there is no need to detach the spreader extensions.

In view of the discussion immediately above relative to the operation of the pivotal suspension and the universal joint cooperation the flexibility and advantages of the disclosed device are readily comprehended. With the settings of the spreader extensions for best operation, however, it still remains to control the rate of delivery and complete the spreading operation. By adjusting the size of the openings in the bottom of the respective spreader sections, 48 and 63 as described above, and selecting the speed of operation of the chain distributors through adjusting the transmission 58 to the proper speed, control of quantity delivered to the spreader members can be regulated. The delivery means shown as the auger feeders 18 and 19 rotated by the sprocket mechanisms 52 and 54 of the illustrated form of the device, bring the pulverant material through the troughs 16 and 17 of the hopper 14 and dump it into the respective halves of the middle spreader section 24. The drive shaft 28 connected to the transmisison 58 through sprocket mechanisms 52 and 60 moves the chain distributor 42 of the fixed middle section 24 to carry the delivered material over the apertures 48 in each respective half of this section 24. As these apertures 48 are located the spreading of material from this middle section is complete across the back of the vehicle leaving no open spaces.

As the amount of material delivered to the middle spreading section is regulated to be in excess of that required to pass through the controlled apertures in that section, a large portion of it is moved to the end of the trough section in this part of the device and drops through the openings in the ends thereof into the extensions 61 below. There the movement of the chain supported distributors is the same as that described and in synchronism therewith as the universal joints rotate through action of the drive shaft 28, drive shaft 30 cooperating by means of chain 42, and the sprocket drive mechanisms above described. In the apertured half of the extension, the chain distributor moves the deposited material received from the middle section over the apertures through which it falls in controlled supply.

From the foregoing description, read with the drawings, it will be evident that a spreader mechanism is disclosed which gives the flexibility necessary to meet the requirements of economy and good practice. By non-rigid connections permitting forward-backward movement of the extensions together with a lift at the ends of that movement, yet remaining operative and returning to the selected best operating position, unprecedented ease and accuracy of operation have been achieved. Further the elements selected and described which make this combination possible, are not believed, nor are they intended to be exhaustive, but they show one operating solution. The cooperating movement of all elements from a common source of power, regulated and selected for best operation, together with improved and clog-free material moving elements, give assistance to the operation of this device.

As many changes could be made in carrying out the above constructions without departing from the scope of the invention, it is intended that all matter contained in the above description, or shown in the accompanying drawings, shall be interpreted as illustrative and not in a limiting sense.

I claim:

1. In a pulverant material spreader device having a portable hopper and means to deliver the material therefrom in controlled quantities, improved apertured distribution means comprising a middle trough section fixed relative to the hopper in position to receive the pulverant material, laterally extending trough sections positioned below the ends of the middle section to receive the material therefrom, horizontally movable belt supported scrapers in said trough sections, vertical sprocket shafts mounted in the ends of said sections operably supporting said scraper belts, universal joints linking the sprocket shafts of the middle trough section with adjacent shafts of the extensions permitting free swinging movement, and suspending means medially supporting the extensions from the hopper in substantial alignment with the universal joint connections said means including a spacer arm pivotally fixed relative to the extension and a flexible connector horizontally adjustable from the fixed spacer pivot imparting both vertical and horizontal movements to said extension.

2. A lateral pulverant material distributor for a hopper having a discharge conveyor comprising a middle trough section divided longitudinally into forward and rear compartments positioned to receive equal portions of the discharged material and apertured, respectively from the center to opposite ends, and endless belt scraping means adapted to circulate horizontally in said compartments operably supported by vertical sprocket shafts at each end of said section; lateral extensions adapted to fit below the middle section and extend outwardly from the ends thereof similarly divided into compartments with sprocket supported laterally moving endless belt scraping means adapted to receive and move pulverant material over apertures in that compartment in which the scraper movement is away from the hopper; flexible joints connecting adjacent sprocket shafts of the lateral extensions to those of the middle section transferring the scraper drive therebetween and permitting free pivotal movement of the extensions relative to said middle section; and adjustable suspension means above and in substantial alignment with the flexible joints connecting the sections and imparting flexibility of operation.

3. The structure defined in claim 2 further characterized by said adjustable suspension means including a spacer arm pivotally fixed relative to the extensions and a flexible connector horizontally adjustable from the fixed spacer pivot to impart both vertical and horizontal movements to said extension.

4. A pivotal support for spreader extensions including a spacer arm connected to a first pivotal point which is adjustable vertically only, a flexible member connected to a second pivotal point adjustable horizontally only above and in transverse relation to the first pivotal point, and linking means between the free ends of the spacer arm and the flexible member whereby the effects of the separate pivotal points are joined and transmitted to the extending end of the flexible member.

5. A pulverant material distributing device for use with a wheeled vehicle comprising a hopper, means cooperating wtih said hopper to move the material therefrom in controlled quantity, lateral spreading means positioned to receive the material from the hopper including a middle section extending the width of the vehicle and opposite end sections positioned below and extending outwardly of said vehicle from the respective ends of the middle section, each of said sections partitioned longitudinally into distributing and non-distributing compartments, the distributing compartments being apertured to pass pulverant material therethrough, endless chains supporting scrapers positioned to move in said compartments, sprocket shafts vertically mounted at the ends of the sections operatively engaging said chains, flexible joint connectors coupling the sprocket shafts of the middle section with the adjacent shafts of the end sections, and means suspending the end sections for longitudinal and vertical operating movements.

6. The structure defined in claim 5 further characterized by said pivotal suspension means swingably supporting the trough extensions from the hopper including a spacer arm pivotally attached at a point in substantial alignment with and vertically spaced above the pivotal connection between the middle and extension trough sections of the lateral spreading means, flexible means connected to extend from the hopper body above the pivotal connection of the spacer arm and transversely adjustable relative thereto extending to connect with the swingable extension trough section in spaced relation with the free end of the spacer arm.

7. A section for extending the distribution of pulverant material from a supplying source comprising a trough partitioned into longitudinally extending distributing and non-distributing compartments, the distributing compartment slotted in the bottom thereof to emit the pulverant material, an adjustable slide slotted to operably adjust the size of the slots in the bottom of said distributing compartment, supporting means beneath and external of said compartment to support the slotted adjustable slide, a drive sprocket and a driven sprocket positioned at opposite ends of the compartments, an endless chain operatively engaging said sprockets positioned to traverse said compartments, and a plurality of scrapers depending from said chain in spaced relation, each of said scrapers peripherally contacting the walls of the feeding compartment and fashioned to direct the pulverant material from the periphery to the slots in the distributing compartment.

References Cited in the file of this patent

UNITED STATES PATENTS

| | | |
|---|---|---|
| 238,637 | Blevin | Mar. 8, 1881 |
| 399,211 | Reeder | Mar. 5, 1889 |
| 968,267 | Rnof | Aug. 23, 1910 |
| 2,511,514 | Rosselot | June 13, 1950 |
| 2,538,886 | Skibbe et al. | Jan. 13, 1951 |
| 2,538,961 | Biszanitz et al. | Jan. 23, 1951 |
| 2,647,756 | Allersma | Aug. 4, 1953 |